United States Patent [19]

Hamilton et al.

[11] 4,315,175
[45] Feb. 9, 1982

[54] ALUMINUM-TO-COPPER TRANSITION MEMBER FOR ALUMINUM WOUND MOTORS AND ALUMINUM WOUND MOTOR EQUIPPED WITH THE SAME

[75] Inventors: William C. Hamilton, Elnora; William G. Moffatt, Ballston Lake; Gasper Pagnotta, Rexford, all of N.Y.

[73] Assignee: General Electric Company, Schenectady, N.Y.

[21] Appl. No.: 143,342

[22] Filed: Apr. 24, 1980

Related U.S. Application Data

[63] Continuation of Ser. No. 591,833, Jun. 30, 1975, abandoned.

[51] Int. Cl.³ .................. H02K 3/02; H01R 4/02; H01R 4/20; H01R 4/62
[52] U.S. Cl. ............................. 310/71; 29/860; 29/862; 29/873; 174/90; 174/94 R; 228/115; 228/136; 403/179; 403/271; 403/278; 403/285
[58] Field of Search ............ 174/84 R, 84 C, 90, 174/94 R; 29/517, 518, 860, 862, 872, 873, 879, 882; 140/111; 228/3.1, 115, 116, 136, 139, 175, 195, 904; 310/71; 339/275 R, 275 T, 276 R, 276 T, 278 C; 403/179, 270–272, 274, 278, 279, 281, 285

[56] References Cited

U.S. PATENT DOCUMENTS

| | | | |
|---|---|---|---|
| 1,171,591 | 2/1916 | Chubb | 174/94 R X |
| 2,446,542 | 8/1948 | MacInnes | 29/517 X |
| 2,522,408 | 9/1950 | Sowter | 228/115 |
| 2,707,821 | 5/1955 | Sowter | 228/115 |
| 2,736,090 | 2/1956 | Sowter et al. | 228/115 |
| 2,894,322 | 7/1959 | Clair, Jr. | 228/115 |
| 3,277,559 | 10/1966 | Clair, Jr. | 228/116 X |
| 3,708,878 | 1/1973 | Mann, Sr. et al. | 29/860 |

FOREIGN PATENT DOCUMENTS

| | | | |
|---|---|---|---|
| 663144 | 8/1965 | Belgium | 339/276 R |
| 711792 | 7/1954 | United Kingdom | 174/94 R |
| 1330002 | 9/1973 | United Kingdom | 174/94 R |

OTHER PUBLICATIONS

Yeaple, F., "New Designs for Aluminum Motors Include Fool–Proof Connectors", *Product Engineering*, Dec. 1974, pp. 19–22.

*Primary Examiner*—Laramie E. Askin
*Attorney, Agent, or Firm*—Leo I. MaLossi; James C. Davis, Jr.

[57] ABSTRACT

An aluminum electrical conductor is electrically joined to a copper electrical conductor by a cold weld lap joint which is substantially free of copper-aluminum intermetallic compounds. The overlapped portions of the conductors are deformed at least 74% and no greater than 82% to achieve a weld joint which has both excellent physical properties and excellent electrical properties. The cold weld lap joint is a reliable electrical connection for electrical circuits experiencing current densities of more than 1000 amperes per square inch and a sustained high temperature of 125° C. and above.

14 Claims, 11 Drawing Figures

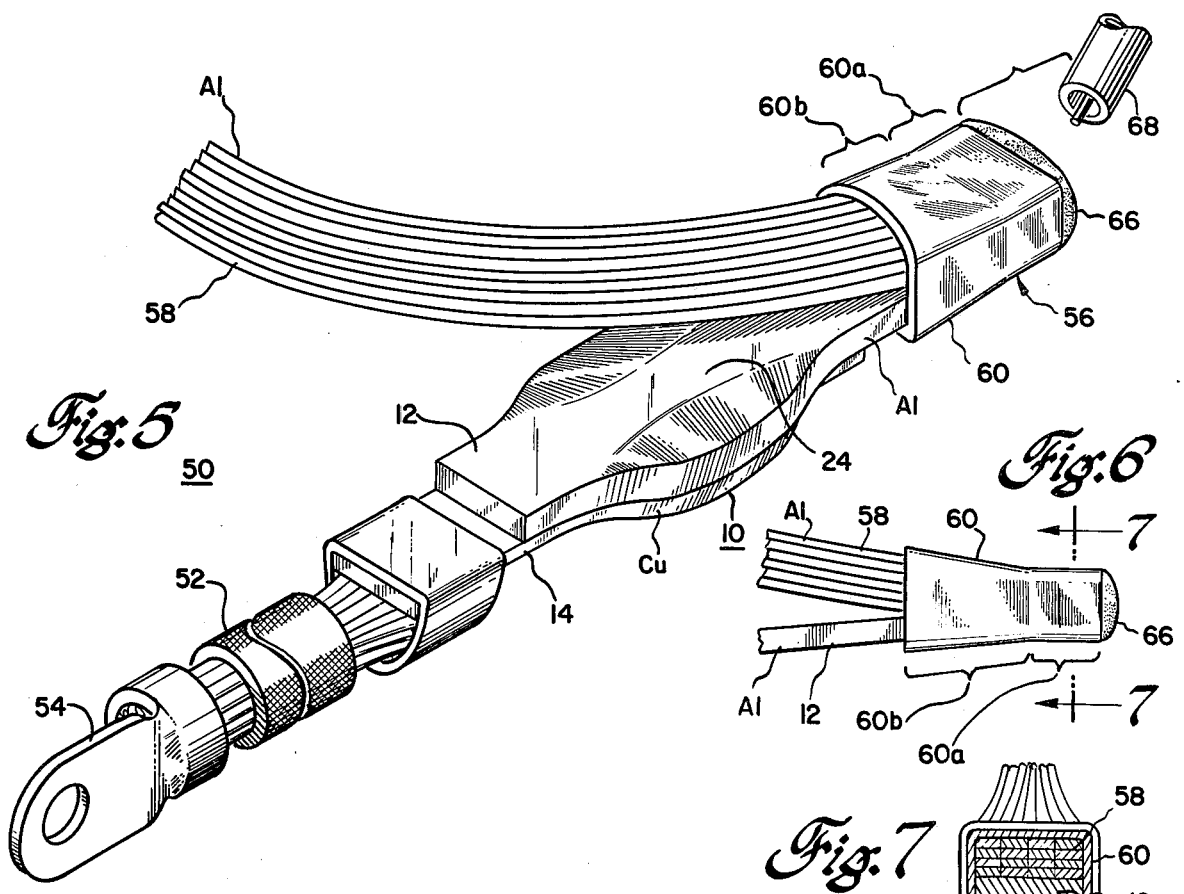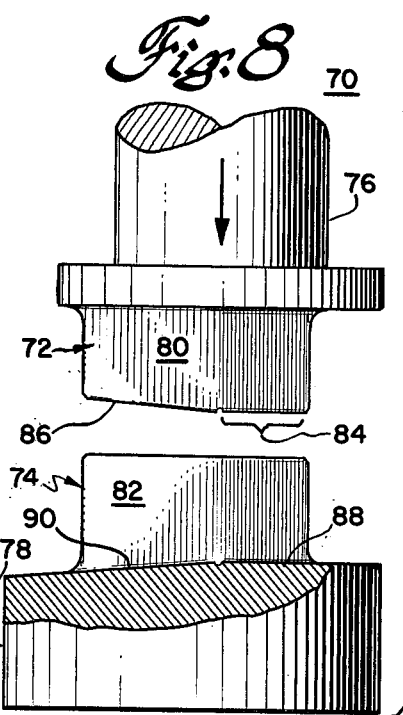

ALUMINUM-TO-COPPER TRANSITION MEMBER FOR ALUMINUM WOUND MOTORS AND ALUMINUM WOUND MOTOR EQUIPPED WITH THE SAME

This is a continuation of application Ser. No. 591,833, filed June 30, 1975, now abandoned.

BACKGROUND OF THE INVENTION

1. Field of the Invention

This invention relates to electrical connections for electrical conductors and to a method for making the same. In particular, the invention relates to an aluminum-to-copper transition member for electrically connecting an aluminum wound motor, transformer or the like into an electrical circuit via a copper connection.

2. Description of the Prior Art

Reliability requirements for electrical connections are becoming increasingly more severe because of additional demands on temperature stability and structural strength of electrically interconnected members. For example, industrial motor requirements include both resistance to severe mechanical stress as well as sustained operation at an elevated temperature range. These motors are designed to operate at a steady-state temperature winding temperature of 125° C. and to experience a temperature rise to about 180° C. on full-voltage reversal and to about 300° C. during 20 second stall conditions. Additionally, the electrical wires of the circuit must be capable of functioning at current densities of about 1000 amperes per square inch and higher. In particular, where the wire elements or electrical wires require an electrical connection between an aluminum electrical conductor and a copper electrical conductor, mechanical stress and heat of joining the two together physically are very important. Interconnection of the two conductors is traditionally made by crimping, soldering, brazing and like methods to provide initially a good solid electrical connection between the two different type conductors. With extreme vibration, high current densities and sustained operation at elevated temperatures, electrical connections made in this manner are unreliable. Failures occur because of mechanical disengagement or burnoff of the connection.

In an aluminum wound industrial motor, a crimp connection depends, for reliability, upon the maintaining of a high interface pressure between the aluminum wires and a connector body which is typically tin-plated copper or copper alloy. In industrial motors wherein the windings are of copper, there is no expansion mismatch with the connector body and the steady-state motor temperature is below that at which significant stress-relaxation would occur. Therefore, a high interference pressure necessary for low resistance joints can be maintained.

However, aluminum has an expansion coefficient about 50% higher than that of the copper connector body. Since the residual compressive stress on the aluminum wires will be of yield-point magnitude after completion of the crimp at room temperature, exposure to high operating temperature ranges can be expected not to result in a further increase in interface pressure because of expansion mismatch. Any tendency for an increase in interface pressure will merely result in plastic flow of the aluminum wire since the aluminum is already at its yield strength. Plastic flow of the aluminum wire also occurs because the yield strength and the creep strength of aluminum are lower at the higher temperatures than for aluminum at room temperature. The resulting plastic flow of the aluminum wires which occurs to relieve the interface stress is not reversible upon cooling to lower temperatures. The interface pressure is now less than the initial interface pressure. This change of interface pressure which occurs during each thermal cycle results in increasing the resistance of the interface. Consequently, the wires when carrying electrical current generate increasing amounts of heat at the connector and the thermal cycling of the wires results in increasing deterioration of the wire conductors and ultimate failure of the same.

Aluminum wire, when freshly shaved to achieve good electrical conductivity characteristics, forms an oxide film thereon almost immediately upon exposure to air. The electrical resistance of the aluminum oxide is sufficient to prevent achieving low resistance electrical contacts without sufficient plastic flow of the aluminum wire. Plastic flow of the wire is necessary to fracture the oxide film to allow extrusion of the freshly exposed oxide-free aluminum into the cracks of the oxide layer thereby making a low resistance electrical contact with the conductors connected thereto. Progressive relaxation of interface pressure during thermal cycling can result in gradual formation of oxide around the periphery of the area of contact of the wire and the connector. The end result is a reduction in the effective area for electrical current transfer therebetween thereby increasing the current density and the thermal energy generated therein at the remaining areas of "clean" metal contact.

Many prior art electrical connections rely on crimp connectors of the "insulation-piercing" type. This enables one to avoid the necessity and cost of having to remove electrical insulation from the ends of wires to be joined together. The connectors may be of several types. One type has serrations on the inner surface of the connector which pierces through the electrical insulation to provide a metal-to-metal electrical contact between the wire and the connector. Another type of connector has an internal perforated screen of electrically conductive metal, such, for example, as brass, wherein the cylindrical surface face of the end portion of the aluminum wire is extruded through the screen to make a metal-to-metal electrical contact. A cap of electrical insulation remains as the top of the extruded button so that a metal-to-metal contact does not occur directly between the wire and the connector body.

The combinations of wire conductors which can be electrically joined together in a connector are innumerable. Wire conductors may be of a solid or a stranded conductor configuration. Each of the wires may be of a different size whether it be an individual conductor or a stranded design. Statistically, a better quality electrical contact is achieved between some wires of a group than with the remaining wires of the group. Large diameter wire conductors are deformed more than small diameter wires in a crimp connection because the external indentation of the crimp connector is fixed. The interface pressure between the connector and individual wires may differ considerably. Solid and stranded copper wires have a different yield and flow behavior than do aluminum wires. The interface pressures therebetween are different from that of aluminum wires.

In abandoned U.S. patent application Ser. No. 508,746, filed on Sept. 24, 1974 (now refiled as Continuation-in-Part Application Ser. No. 10,313, filed Feb. 7, 1979), which is a Continuation of U.S. patent application Ser. No. 400,012, filed on Sept. 24, 1973, and now abandoned, a cold-weld butt joint is described as being suitable for electrically conductive copper-to-aluminum transition members. However, automated production of these transition members is limited because of the method of joining required and the metal flash which must be removed. This cold weld butt joint method is also described in *Product Engineering,* December, 1974, Pages 19-22. Additionally, copper material, more costly at this time, is wasted since the conductors, or elements, must be of the same wire size physically for fabrication. However, since copper is more electrically conductive, it would be highly desirable to employ copper wire of smaller wire size material with aluminum of the same electrical conductivity but larger wire size physically.

Additionally, statistically, only some of the extruded aluminum wire will have a completely formed button, and the remainder will be only partially formed by the brass screen. A similar variation in contacting is achieved by the serrated portions of the other type connector. Both result in a variable quality of connection of given wires to a connector. This variability of connection quality inevitably leads to a condition in which certain wires of a group afford a lower resistance path between connectors and therefore, initially, carry a greater share of the total electrical current carried by the stranded cable. Consequently, these wires experience higher thermal gradients and earlier than anticipated degradation of the wire insulation resulting in premature motor failure. The "lazy wires", those which do not carry their share of the electrical load, do not begin to carry current until the increased resistance of the wires initially carrying the current approaches that of the "lazy wires".

An object of this invention is to provide electrical connections which substantially reduce the premature electrical failure of industrial electric motors, transformers, and the like.

Another object of this invention is to provide a reliable electrical connection between the windings of an aluminum wound electrical motor and copper wire connectors.

A further object of this invention is to provide a transition member embodying a cold weld lap joint for electrically connecting together aluminum and copper conductors.

A further object of this invention is to provide an electrical connection between aluminum and copper stranded wire conductors wherein all wire conductors in the stranded wire conductor carry substantially the same electrical current at all times.

A still further object of this invention is to provide a motor having all welded connections to eliminate the problem of "lazy wires" in the motor resulting in premature failures.

Other objects of this invention will, in part, be obvious and will, in part, appear hereinafter.

BRIEF DESCRIPTION OF THE INVENTION

In accordance with the teachings of the invention, there is provided a transition member having an aluminum conductor and a copper conductor. A cold-weld lap joint joins the aluminum conductor to the copper conductor for the transmission of electrical energy therethrough. The joint of the lap weld and the material of the conductors in the vicinity thereof are at least initially substantially free of copper-aluminum intermetallic compounds and voids. A second metallurgical bond, preferably a fusion-weld, electrically joins the aluminum conductor to at least one aluminum wire element. A third metallurgical bond, preferably a fusion-weld, electrically joins the copper conductor to at least one copper element.

DESCRIPTION OF THE DRAWINGS

FIG. 5 is a perspective view illustrating the employment of the transition member of this invention with other electrical conductors and connectors.

FIG. 6 is a fragmentary side elevation view of the electrical connection arrangement of FIG. 5.

FIG. 7 is a cross-sectional end view taken along the plane 7—7 in FIG. 6 showing the deformed arrangement of the multiple strands of the stranded conductor of FIG. 5 in a completed embodiment of the connection of the invention.

FIG. 8 is a side elevational view, partly in cross-section, of a mechanical die used in the method of the invention to form the connection shown in FIGS. 5-7.

FIG. 9 is a flow chart describing some of the basic steps of the method of manufacture of the joining of aluminum wire conductors to the aluminum conductor of the transition member of this invention.

DESCRIPTION OF THE PREFERRED EMBODIMENT

Figure 1:
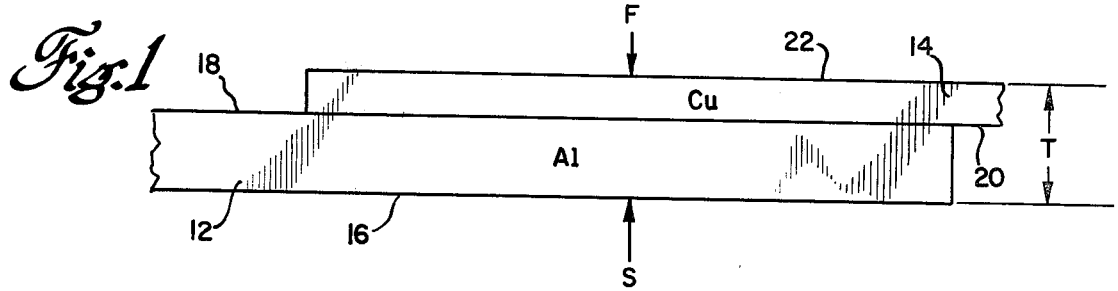
FIG. 1 is an elevation view of the relationship of the electrical conductors of the transition member of this invention.
Figure 2:
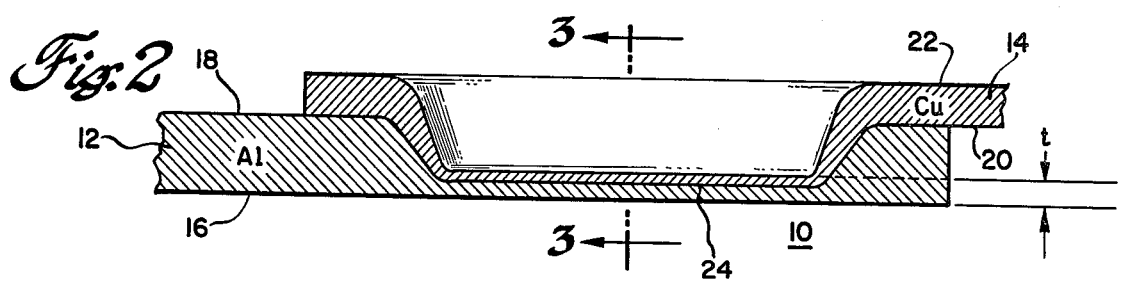
FIG. 2 is an elevational view, in cross-section, of a cold weld lap joint of a copper-to-aluminum electrical transition member made in accordance with the teachings of this invention.
Figure 3:
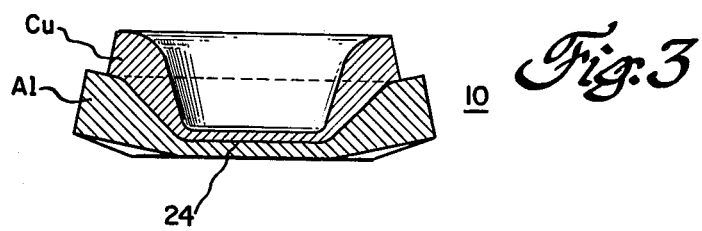
FIG. 3 is a sectional view taken along line 3—3 of FIG. 2.

Referring to FIGS. 1 through 3, an aluminum-to-copper electrically conductive transition member 10 includes an aluminum conductor 12 and a copper conductor 14. Each of the conductors 12 and 14 may be of any geometrical shape, being round, oval, rectangular and the like. To illustrate the fabrication of the member 10 more clearly, and for no other purpose, each conductor 12 and 14 is said to be flat strip material having a rectangular configuration.

The aluminum conductor 12 has a bottom surface 16 and a top surface 18. The copper conductor has a bottom surface 20 and a top surface 22. Preferably, end portions of each of the conductors 12 and 14 are positioned in an overlapping manner in abutting contact with each other. That is, the bottom surface 20 of the copper conductor 14 is in physical contact with the top surface 18 of the aluminum conductor 12. At least the surfaces in contact with each other are cleaned by such suitable means as by wire brushing to achieve good clean, substantially oxide free, surfaces in abutting contact with each other. The bottom surface 16 of the aluminum conductor 12 is placed on a support, s, and a force F, is applied to the top surface 22 of the copper conductor 14. The force F is sufficient to reduce the initial combined thickness T of the conductors 12 and 14 to the resulting combined thickness t which exemplifies, in part, the novel electrically conductive, physically strong, cold weld lap joint 24 of this invention. The thickness t of the base of the cup-shaped weld configuration is from 0.18 to 0.26 of the initial thickness T. For best results, t is from 0.20T to 0.23T and preferably is 0.21T±0.005T.

The lap weld joint 24 must be capable of a current carrying capacity which is exemplified by a current density of about 3700 amperes per square inch at a sustained operating temperature of approximately 125° C. and 22,200 amperes per square inch during stall conditions. The current density, or current carrying capacity of the cold weld is determined by the length of the periphery of the weld as the transfer of electrical current between the members 12 and 14 occurs substantially in this region only. Additionally, it is desirable to optimize the dimensions of the conductors 12 and 14 so that their respective current carrying capacities match for the best physical and electrical properties of the joint 24. A circular configuration is least desirable as an increase in diameter produces a larger increase in area than length of perimeter. As stated previously, we are looking for the maximum length of perimeter available for the optimum physical electrical properties of the joint 24.

Figure 4:
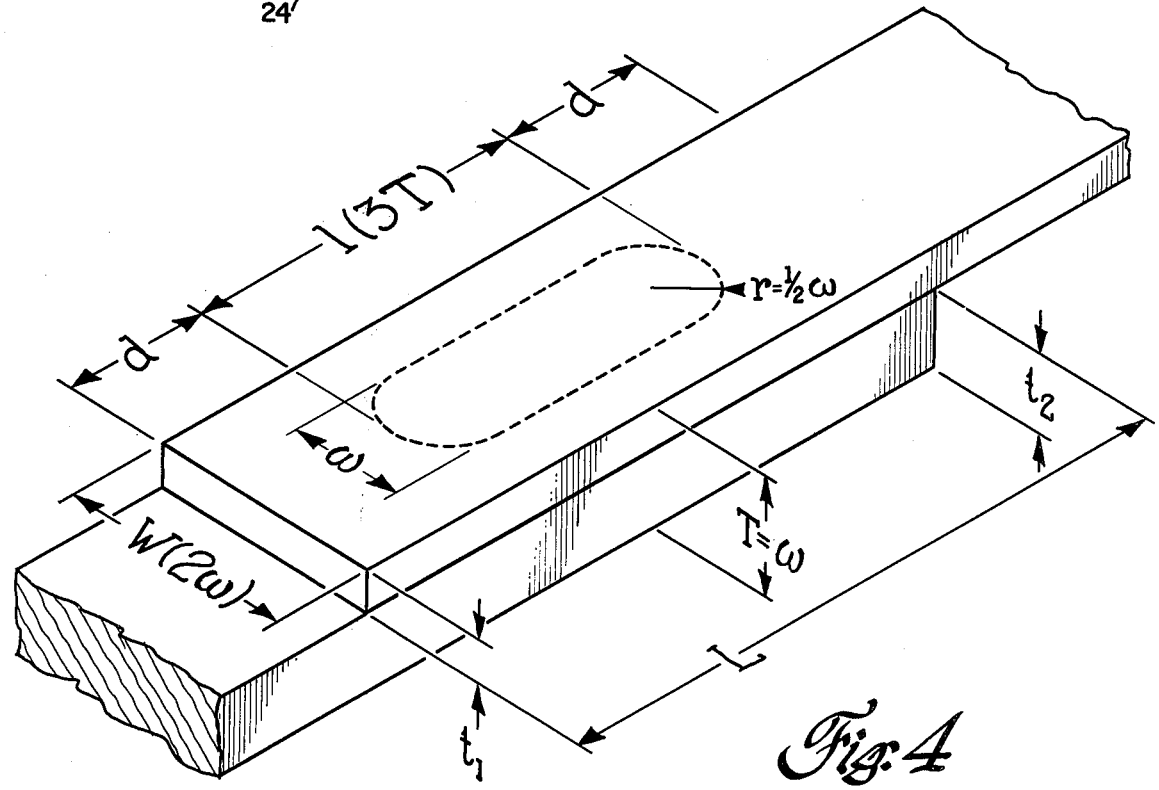
FIG. 4 is a perspective view of a layout of the transition member of this invention.

Therefore, the weld joint 24 preferably has a rectangular configuration. With additional reference to FIG. 4, there is shown a means for approximating the size of the cold weld joint 24 as well as the dimensions of the punch required to make the joint 24. The basic ground rules are as follows:

1. the punch width, w, is equal to the total thickness, T, of both conductors (i.e. $t_1 + t_2$) to be cold welded together.

$$w = T \tag{1}$$

2. the punch length, l, is at least equal to three times the total thickness.

$$l = 3T \tag{2}$$

3. the total width of the stock, W, is at least equal to twice the width, w, of the punch.

$$W = 2w \tag{3}$$

4. the overlap, L, is a minimum of 5.4 times the total thickness, T.

$$L = 5.4T \tag{4}$$

5. the distance, d, that the nearest portion of the weld joint is from the end of the conductor is from one-fourth to one-third the length of the punch, l. Preferably, d is no less than four tenths of the length of the punch l.

$$d = 0.41 \, l \tag{5}$$

Employing a punch designed to the above mathematical relationships, one is able to make excellent cold weld joints 24. Sufficient force F must be applied to produce a weld of t=0.26T to obtain a minimum workable electrically conductive joint 24. The mass of the cold weld at this ratio is such that sufficient high electrical contact resistance is being encountered as to create concern on how to economically dissipate the created thermal energy efficiently.

It is to be noted that the mathematical relationships are a guide for the weld and punch design only. A punch has been designed and successfully employed to make reliable cold weld electrically conductive lap joints in accordance with the teachings of this invention except that w<T. Such a condition arose when the coductors to be joined together did not have sufficient width to enable the use of a punch wherein w=T.

As the deformation of the total thickness T increasingly exceeds 79%, or t<9.21T, the cross-section of the cold weld becomes increasingly less. The cold weld becomes thinner in cross-section and its strength is continually decreasing. For maximum physical strength of the cold weld and maximum current density carrying ability, the optimum cold weld is achieved when the total thickness T is reduced 79%±0.5% or t=0.21T±0.005T.

Physical testing of cold welds made in accordance with the teachings of this invention is practiced constantly during manufacturing of the member 10 (FIG. 5). Employing a standard tensile test machine, the member 10 is pulled in tension to determine the mode of failure of the cold weld joint 24 and its physical appearance. A good, acceptable cold weld will separate about the periphery of the cold weld joint 24. A button of aluminum will remain attached to the copper conductor 14. A cold weld joint 24 produced at too great a reduction in the total thickness T of the conductors 12 and 14 and pulled in tension easily separates. The strength of the cold weld is less and only a thin layer of aluminum remains adhered to the copper conductor 14 when the specimen weld fails. Such welds may fail during normal handling of the member 10 when joining it to conductors of a motor.

The cold weld and the punch are designed with generous corner radii of ½ w to provide strain relief in the corners of the weld.

The displaced metal of the conductors 12 and 14 flows predominantly laterally and upward. This produces a cup-like cold weld joint configuration. The displaced metal acts as an integral heat sink or cooling member to assist in dissipating the thermal energy generated during functioning of the member 10. Alternately, should the displaced metal interfere in packaging the windings of the electrical motor of which it is a component, the excess metal may be removed by any suitable manufacturing process which will not produce copper-aluminum intermetallic compounds in the joint 24.

Figure 11:
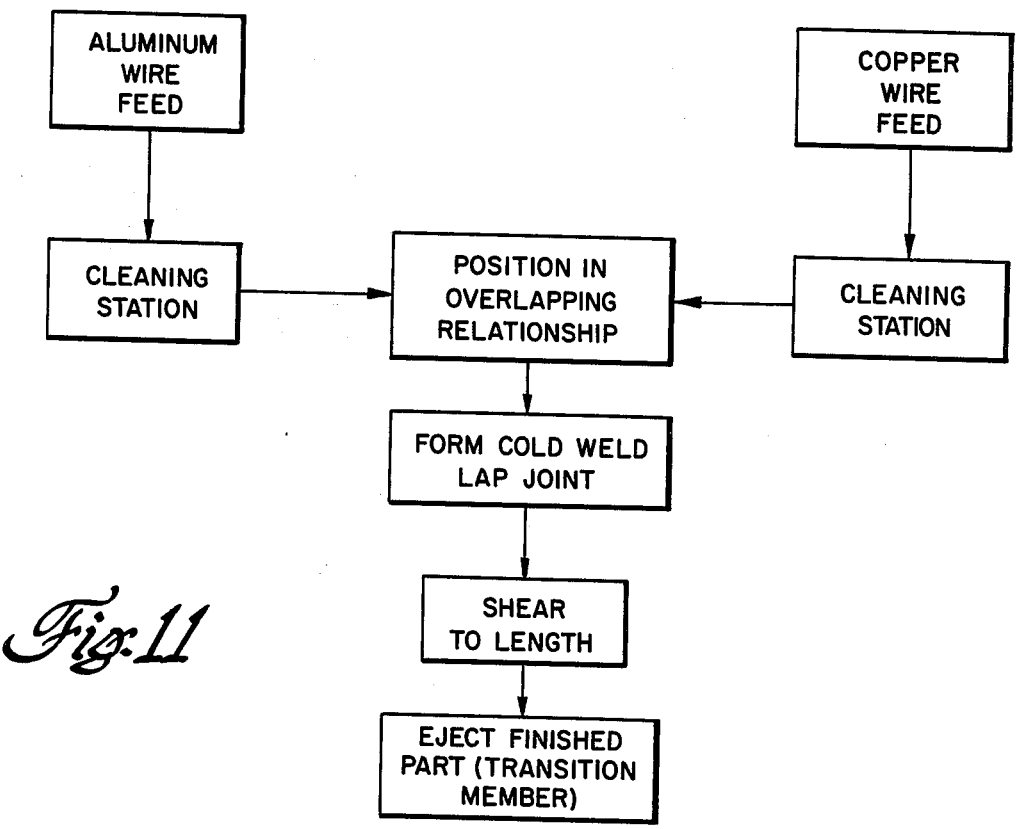
FIG. 11 is a flow chart of a process for making a transition member.

The transition member 10 lends itself readily to automatic and semi-automatic production processing. Referring to the flow chart of FIG. 11, the conductors 12 and 14 may each be fed from their respective reels of strip wire into a punch press. Employing suitable means such, for example, as sequentially operated pneumatic wire strip grippers, the strip wire conductor is drawn from the reel, inserted into a suitable die configured to produce the desired cold weld joint 24, cold welded to the second strip wire conductor, sheared to length and ejected from the die. Additionally, each of the surfaces of each conductor may be individually or simultaneously cleaned by suitable means such, for example, as by automated wire brushes to present clean surfaces in abutting contact with each other. The remaining surfaces of the conductors may also be cleaned at this time to facilitate joining the transition member to appropriate electrical conductors thereafter.

The manufacturing of the transition member 10 is also more easily accomplished, at a more economical cost, than the prior art butt-weld cold weld transition member. Additionally, there is no flash metal which must be removed before the next assembly operation. A punch press, punch, and back-up plate are the only capital tools required to produce the member 10 at a high productive rate and excellent reliability and joint quality.

As manufactured, the joint of the lap weld and the material of the conductors in the vicinity thereof are at least initially substantially free of copper-aluminum intermetallic compounds and voids. The importance of this is seen in that the joint will function at lower temperatures. Therefore, any growth of intermetallic compounds, and maybe voids thereafter, will occur substantially only through natural diffusion between the metals. If intermetallic compounds are present when the joint is formed, as occurs when heat is employed to make the joint, the electrical resistance of the material at the joint is initially higher. The result is the temperature of the joint during operation may be higher than usual and may cause interdiffusion to occur at a faster rate than the natural occurrence. Such a happening as this will shorten the useful life of the joint, the transition member and the electrical apparatus employing the same. Although it is of no consequence to the description of the present invention, the copper end of transition element 10 is shown electrically connected to a conventional, stranded, insulated copper conductor 52 that has a terminal 54 crimped to the outer end thereof. Typically, the terminal 54 will be connected by a wing nut to a threaded stud onto a terminal board or other suitable means for connecting electric power cables to the terminal 54 and through it to the transition member 10.

Figure 10:
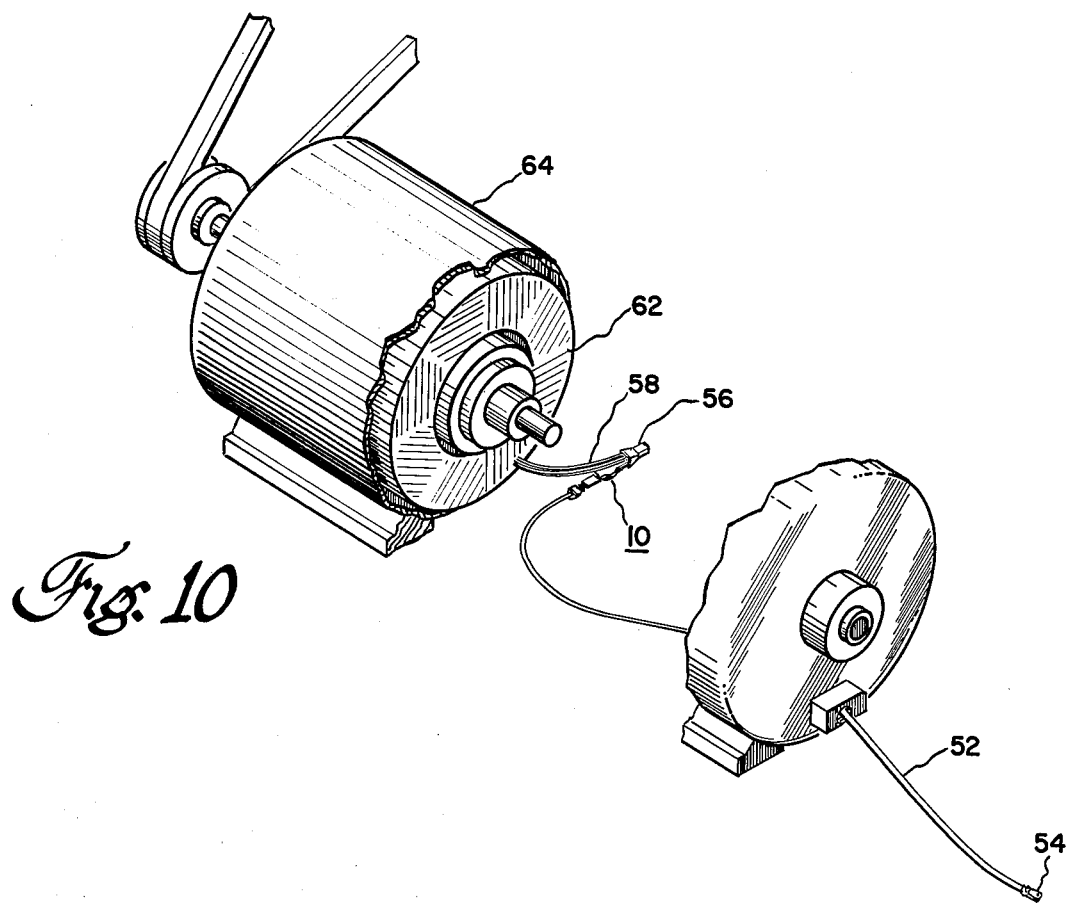
FIG. 10 is a perspective view, partly in cross-section, of an electrical motor embodying the transition member of this invention.

The other end of the transition member 10 is provided with an aluminum-to-aluminum connection 56 that is constructed pursuant to the present invention of William C. Hamilton as described in abandoned application Ser. No. 503,820, filed Sept. 6, 1974 (now refiled as continuation application Ser. No. 888,808, filed Mar. 21, 1978). In addition to the first integral aluminum conductor 12, the connection 56 comprises a second multi-strand conductor 58 and an electrically conductive metal ferrule 60, which in the preferred embodiment of the Hamilton invention is also formed of aluminum. However, it should be understood that any other suitable compressible metal that is electrically conductive and which may be fusion welded to form a low electrical resistance weld may be used for the ferrule 60. In the illustrated embodiment of the Hamilton invention, the multi-strand conductor 58 is an end portion of an aluminum motor winding 62 of a motor 64 (FIG. 10). Obviously, the connection of the invention may be used in a number of different applications, but it is particularly well-suited for making aluminum-to-aluminum connections in the type of environment suggested by the illustration of FIG. 5; namely, an environment that subjects the connection to both mechanical vibration and a wide range of thermal cycling, due to the passage of high current through the transition member 10 and the multik-strand conductor 58 to the motor winding when it is started.

As previously described in aforementioned patent application Ser. No. 503,820, filed on Sept. 6, 1974, an important feature of the connection 50 of that invention is the arrangement of the strands of conductor 58 within the ferrule 60 in a manner that substantially eliminates all void spaces between the individual strands of conductor 58. This feature of the Hamilton invention can best be illustrated by reference to FIGS. 6 and 7 of the drawings. As shown in those FIGURES and in FIG. 5, the end of ferrule 60 closest to the overlapped juxtaposed ends of the conductors 12 and 58 has a compressed portion 60a that is effective to deform the overlapped ends of at least some of the conductors compressed within the ferrule to thereby eliminate substantially all void spaces between the conductors within the compressed portion 60a ferrule 60. This compressed arrangement of the strands of conductors is best seen in the cross-sectional view of FIG. 7 which depicts the compressed ends of the multiple strands of conductor 58 in contiguous engaged relationship. It has been found that this type of very close spacing between the conductors within ferrule 60 is important to the formation of a long-term reliable, low electrical resistance joint when the ends of the conductors are welded pursuant to a subsequent step of the Hamilton invention. Absent such optimum compression and elimination of voids between adjacent conductors within the ferrule 60, it has been discovered that when the ends of the conductors and the end of the ferrule 60 are welded to provide the desired mechanical and electrical characteristics of the connection, areas of high resistance may be formed. It is believed that such so-called hot spots result if the wire and ferrule are not held in good thermal and electrical conductivity during welding. Secifically, if a wire has a void around all or part of it during the welding process, the wire will not be able to dissipate heat from the welding current and it will be partially vaporized instead of melting and fusing to adjacent wires in a controlled manner. Alternatively, such as inadequately compressed (and thermally connected) wire will melt irregularly when welding occurs, so that the cross-sectional area of the wire is greatly reduced to form a high resistance electrical path that will overheat during subsequent operations.

Pursuant to the invention of Hamilton, the ferrule 60 is compressed to deform the multiple strands of conductor 58 at least 10 percent in cross-sectional area from their uncompressed state. To effect this compression, the strands of conductor 58 are constrained from radial movement by the sides of ferrule 60 which in turn are constrained by a suitable crimping die (not shown) while the compressive force is applied thereto. It will be noted that in the preferred embodiment all of the strands of conductor 58 are held against a single, generally flat side of conductor 12 so that an essentially straight line weld may be formed as will now be explained.

Another important feature of the connection 50 of the invention of Hamilton is that it comprises a fusion weld 66 formed by an inert-gas-shielded welding process at the overlapped ends of the conductors 12 and 58 and includes parts of the compressed end 60a of the ferrule 60. In the preferred embodiment of the Hamilton invention, the weld 66 is formed with a suitable, conventional tungsten-inert-gas welding torch 68, only the nozzle of which is depicted. This torch is used to fuse the compressed ends of ferrule 60 and the conductors 12 and 58 without introducing any significant impurities into the resultant aluminum weld.

As shown in FIGS. 5 and 6, the compressed portion 60a of ferrule 60 preferably overlaps the ends of conductors 12 and 58 by approximately ¼ of an inch; however, it has been found that the most suitable type of low electrical resistance, mechanically reliable connection 56 can be formed if the compressed portion 60a of the ferrule encircles at least 1/16th inch of the conductors 12 and 58.

In order to provide mechanical strain relief for the deformed end portions of the strands of conductor 58, a second uncompressed, or only partially compressed, portion 60b of the ferrule 60 is formed to taper uniformly outwardly from the deformed area of the conductors to the uncompressed end of the ferrule. The outermost end of portion 60b of ferrule 60 closely surrounds the strands of conductor 58 but does not cause them to be mechanically deformed. Preferably, the degree of taper of the portion 60b is similar to that illustrated in FIG. 6, such that the uncompressed end of ferrule 60 closely surrounds the strands of conductor 58 to provide optimum mechanical stress relief for them while confining their movement relative to conductor 12. With this arrangement and the deformation of these strands of conductor 58 on a single side of the generally rectangular in cross-section aluminum conductor 12, in the preferred embodiment of the Hamilton invention, the low electrical resistance weld 66 is formed in a generally straight line across the ends of all of the strands of conductor 58 thereby to avoid the formation of any hot spots in the connection 56 due to a poor electrical or mechanical joint of the type that might result if only a resistance weld or a cold welding method were to be used, pursuant to some teachings of the prior art, in an attempt to form a desired aluminum-to-aluminum connection.

One preferred method of obtaining a straight-line weld at the overlapped ends of conductors 12 and 58 is to cut an overlapped portion of the ends with a straight-edged shear, then weld the resultant exposed ends. In addition to affording a straight weld line, this method provides an unoxidized welding surface just before the ends of the conductors are fused by applying a fusing temperature from the tungsten-inert-gas torch. This procedure has been found to be particularly helpful in attaining a low electrical, long-life electrical connection pursuant to the present invention when all of the conductors that are fused together have equal diameters, unequal diameters or when large flat rectangular conductors are included.

Alternately, the strands of conductor 58 may be gathered together and compressed into a preform prior to insertion into the ferrule 60. This facilitates fabrication and increases the reliability of the weld joint formation thereafter. Such increase in reliability is achieved by eliminating some of the voids prior to compression within the ferrule 60.

From the foregoing description of the connection 56 of the Hamilton invention, those skilled in the art will be able to manufacture such connections by various methods; however, in order to fully disclose the preferred embodiment of this invention it is desirable to also describe a preferred method of manufacturing the Hamilton connection 56. This preferred method, which forms part of the Hamilton invention, will be described with reference to FIG. 9 of the drawings which comprises a flow chart of the main steps of the preferred method of the Hamilton invention.

Accordingly, by referring to FIG. 9, it will be seen that the preferred method of forming an electrical connection between a first electrical conductor and a second electrical conductor pursuant to the Hamilton invention comprises the steps of first providing first and second aluminum conductors and a compressible metal ferrule which is formed of electrically conductive metal in a configuration adapted to receive the conductors in overlapped relationship therein and restrain them against radial movement when the ferrule is compressed in subsequent operations of the method of manufacture. After the conductors are overlapped in the ferrule, a pre-determined force is applied to a given portion of the ferrule to compress it against the conductors causing at least some of them to deform and flow sufficiently to substantially fill any voids between the conductors. Finally, the compressed ends of the conductors and the ferrule are fusion welded by an inert-gas-shielded welding operation. As noted above, the overlapped ends of the conductors are trimmed or sheared to provide a flat uniform welding surface prior to such welding.

In other modified forms of the preferred method of the Hamilton invention, a special press or mechanical die is provided for receiving therein and compressing the ferrule and conductor ends of a wide variety of different sizes of conductors and ferrules. Preferably, the provided press is hydraulically actuated and operable to sequentially apply the above-described critical compressive force to a uniform pre-set pressure that effectively affords the desired sufficient deformation of each one of the wide variety of relatively different sized conductors when they are positioned in successive operations within the press. By using such a pre-set constant pressure, it has been discovered that it is possible to obtain the desired degree of mechanical deformation of the conductors, provided suitably close fitting ferrules are selected for pairs of conductors being joined, to form a successful connection of the type described in detail above with reference to FIG. 5. Thus, it is not necessary to measure each conductor deforming operation to ascertain if the desired minimum 10 percent deformation in cross-sectional area is obtained in each compressing operation of the ferrule, because the pre-set uniform pressure will assure at least such a degree of compression for each size connection.

One form of the special press or mechanical die 70 described in the preceding paragraph is shown in FIG. 8. The die 70 comprises a pair of reciprocally mounted jaws 72 and 74 that are supported for such movement respectively on suitable rods 76 and 78. The jaw 72 has a single tooth 80 that is operably positioned to fit closely between the two arms (one shown at 82) of jaw 74. The bottom surface of tooth 80 comprises a generally flat portion 84 and a sloped surface 86. These surfaces are arranged to move toward a flat portion 88 and a matching tapered surface 90 on the jaw 74. In operation of this special die, the ferrule 60 would be placed between the jaws and they would be driven toward one another to compress the ferrule and form the generally flat portion 60a and tapered portion 60b thereof.

Finally, in a further modification of the preferred embodiment of the Hamilton invention, which is particularly adaptable for the deformation of electrical conductors of aluminum magnet wire in electric motors, when one of the conductors used in the steps of the above-outlined preferred method of the Hamilton invention is a varnish-insulated multi-strand conductor, a preliminary step is included in the preferred method of the Hamilton invention that will accomplish removal of the varnish from the ends of the strands of the multi-strand conductor that are to be compressed before the ends are inserted into the ferrule. Thus, it should be understood that in such a preliminary step, the varnish may be removed by either a mechanical or chemical stripping operation of any conventional well-known type.

The cold weld joint and the material in the vicinity thereof have been described heretofore as being free of copper-aluminum intermetallic compounds and voids. However, one must realize that the diffusion of copper and aluminum into each other will begin to occur once they are joined together. The rate of diffusion into each other will increase during operation of the circuit and/or apparatus in which the transition member is a component. But, the joint is initially substantially free of copper-aluminum intermetallic compounds since no heat is employed to form the joint. Therefore, the possibility of the formation of intermetallic compounds during fabrication is substantially nil.

The electrical resistance of the transition member and the cold weld joint is essentially the same as the combination of the aluminum and copper conductors of the member when initially joined together. The transition member consequently operates at a lower temperature than prior art connectors since the thermal energy generated in the member is less. The heat generated during circuit operation will cause formation of intermetallic compounds at a rate dependent on temperature and time at temperature. Additionally, because copper and aluminum diffuse into each other at different rates, there is a mass-flow imbalance, which creates vacancies that coalesce into macroscopic voids. However, it has been established that a deleterious effect of either the intermetallic compounds or the voids is of no consequence until a time-temperature spectrum comparable to a hundred years or more of steady state motor operation has occurred.

We claim as our invention:

1. An electrical transition member consisting of:
a single longitudinally-extending copper conductor and a single longitudinally-extending aluminum conductor in overlapping relationship, the cross-sectional areas of said conductors being so related in size as to provide closely matched electrical current carrying capacities,
said conductors being joined together by a single cold weld joint in which a portion of said copper conductor has been displaced into said aluminum conductor resulting in a cup-shaped configuration having an inside surface of copper and being of generally rectangular shape,
said cup-shaped configuration having an inside width approximately equal to the total of the thicknesses of said conductors and an inside length approximately equal to three times said total of conductor thicknesses,
the thickness of the base of said cup-shaped configuration being in the range of from 18 to 26 percent of said total of conductor thicknesses, and
said cold weld joint as formed, and the material of said conductors in the vicinity thereof, being substantially free of copper-aluminum intermetallic compounds and voids.

2. The electrical transition member of claim 1 wherein the thickness of the base of the cup-shaped configuration is in the range of from 20 to 23 percent of the total of conductor thicknesses.

3. The electrical transition member of claim 1 wherein the thickness of the base of the cup-shaped configuration is 21 percent ±½ percent of the total of conductor thicknesses.

4. The electrical transition member of claim 1 wherein the conductors are of the same width, said width being at least equal to twice the inside width of the cup-shaped configuration.

5. The electrical transition member of claim 1 wherein the length of overlap of the conductors is at least about 5.4 times the total of conductor thicknesses.

6. The electrical transition member of claim 5 wherein the distance from the cup-shaped configuration to the end of the conductor adjacent thereto is at least about 0.41 times the total of conductor thicknesses.

7. An aluminum wound motor equipped to accommodate electrical connection thereto comprising in combination:
an aluminum wound motor,
a multi-strand aluminum conductor electrically connected to said motor,
an electrical transition member electrically connected to the distal end of said multi-strand aluminum conductor and
an electrically conductive metal ferrule forming part of the connection between said multi-strand aluminum conductor and said transition member,
said transition member consisting of a single longitudinally-extending copper conductor and a single longitudinally-extending aluminum conductor in overlapping relationship, the cross-sectional areas of said conductors being so related in size as to provide closely matched electrical current carrying capacities,
said conductors being joined together by a single cold weld joint in which a portion of said copper conductor has been displaced into said aluminum conductor resulting in a cup-shaped configuration having an inside surface of copper and being of generally rectangular shape,
said cup-shaped configuration having an inside width approximately equal to the total of the thicknesses of said conductors and an inside length approximately equal to three times said total of conductor thicknesses,
the thickness of the base of said cup-shaped configuration being in the range of from 18 to 26 percent of said total of conductor thicknesses and
said cold weld joint as formed, and the material of said conductors in the vicinity thereof, being substantially free of copper-aluminum intermetallic compounds and voids,
said distal end of said multi-strand aluminum conductor and the end of said single aluminum conductor of said transition member being positioned in said ferrule in an overlapping arrangement, said overlapped ends being compressed within a portion of said ferrule so as to deform the multistrand aluminum conductor and substantially eliminate voids between individual strands, and between the multi-strand conductor and said single aluminum conductor at this location,
said overlapped ends and said ferrule portion being joined by a fusion weld.

8. The aluminum wound motor equipped as recited in claim 7 wherein the deformation of the cross-section of the multi-strand aluminum conductor within the portion of the ferrule is at least about 10 percent.

9. The aluminum wound motor equipped as recited in claim 7 in which the electrical transition member has as the thickness of the base of the cup-shaped configuration a thickness in the range of from 20 to 23 percent of the total of conductor thicknesses.

10. The aluminum wound motor equipped as recited in claim 7 in which the electrical transition member has as the thickness of the base of the cup-shaped configuration a thickness of 21 percent ±½ percent of the total of conductor thicknesses.

11. The aluminum wound motor equipped as recited in claim 7 in which the electrical transition member has conductors of the same width, said width being at least equal to twice the inside width of the cup-shaped configuration.

12. The aluminum wound motor equipped as recited in claim 7 in which the electrical transition member has as the length of overlap of the conductors a length at least about 5.4 times the total of conductor thicknesses.

13. The aluminum wound motor equipped as recited in claim 12 in which the electrical transition member has as the distance from the cup-shaped configuration to the end of the conductor adjacent thereto a distance at least about 0.41 times the total of conductor thicknesses.

14. The aluminum wound motor as recited in claim 7 in which the ferrule is made of aluminum-base metal.

* * * * *